United States Patent
Liska et al.

[15] 3,696,277
[45] Oct. 3, 1972

[54] START CIRCUIT FOR DC MOTOR HAVING A THYRISTOR COMMUTATOR

[72] Inventors: Manfred Liska, Klaus Hübner, both of Munich, Germany

[73] Assignee: Siemens Aktiengesellschaft, Berlin and Munich, Germany

[22] Filed: Oct. 29, 1970

[21] Appl. No.: 85,119

[30] Foreign Application Priority Data

Oct. 31, 1969  Germany..........P 19 54 846.0

[52] U.S. Cl. ...................318/138, 318/254, 318/439
[51] Int. Cl. ..............................................F02n 11/00
[58] Field of Search.......318/138, 254, 696, 685, 439

[56] References Cited

UNITED STATES PATENTS

| | | |
|---|---|---|
| 3,488,566 | 1/1970 | Fukuda..................318/254 X |
| 3,517,289 | 6/1970 | Brunner et al.........318/254 X |
| 3,518,516 | 6/1970 | Pawletko...................318/138 |
| 3,319,104 | 5/1967 | Yasuoka et al............318/138 |
| 3,412,303 | 11/1968 | Raues.........................318/138 |
| 2,814,769 | 11/1957 | Williams....................318/138 |
| 3,402,337 | 9/1968 | Malmborg et al. ........318/254 |
| 3,242,406 | 3/1966 | Tanaka......................318/138 |

*Primary Examiner*—G. R. Simmons
*Attorney*—Curt M. Avery, Arthur E. Wilfond, Herbert L. Lerner and Daniel J. Tick

[57] ABSTRACT

When firing or ignition transformers are utilized in the firing or ignition circuit of an electronic commutator such as, for example, that utilized in the Siemotron drive, there is no ignition or firing pulse at the thyristors during the start of the motor due to the signal provided by the rotor position sensor. In order to insure a reliable start of the motor, additional firing pulses are periodically applied to the firing circuit. Upon the attainment of a specific speed, the additional pulses are automatically discontinued.

10 Claims, 5 Drawing Figures

PATENTED OCT 3 1972

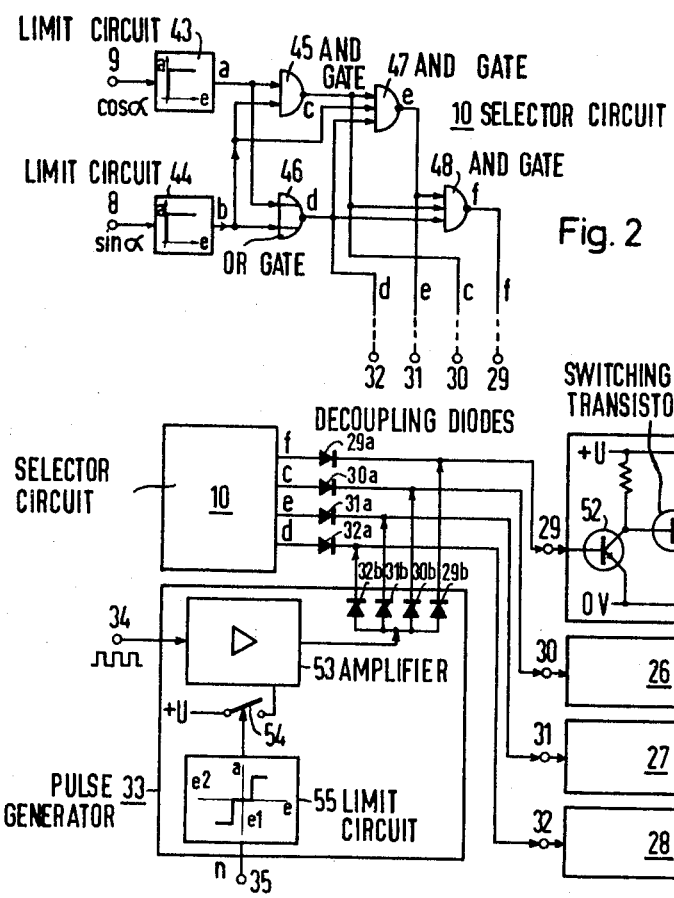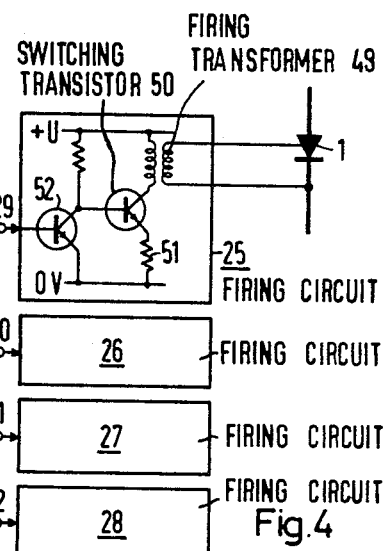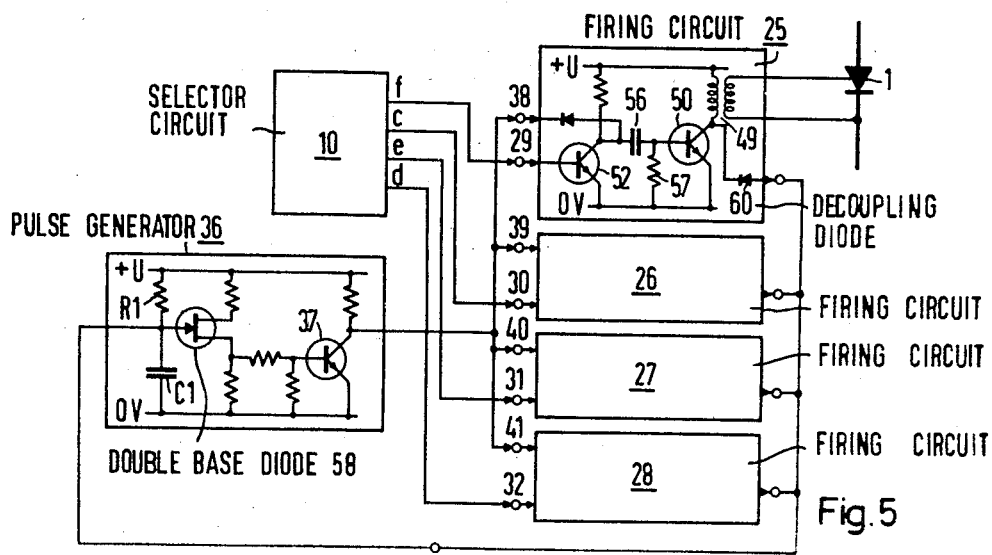

START CIRCUIT FOR DC MOTOR HAVING A THYRISTOR COMMUTATOR

The invention relates to a start circuit for a DC motor having a thyristor commutator. More particularly, the invention relates to a start circuit for a DC motor having a thyristor commutator, the thyristors of which are conductively controlled in accordance with the position of the motor rotor, via firing or ignition transformers of switching transistors.

In a thyristor commutator of the type described herein, a thyristor is connected in series with a winding of the motor and is connected to a source of direct voltage. The thyristor is conductively controlled during the position of the rotor of the motor at which the winding produces a maximum torque with the magnetic field, analogously to the mode of operation of a known commutator utilizing brushes.

The firing or ignition pulses for the thyristors of the commutator are derived in commutators of the type of the invention from the output signals of a rotor position sensor or indicator. Since, due to the necessary galvanic separation, firing or ignition transformers must usually be utilized, the firing pulses may be provided only during signal changes of the rotor position sensor, that is, when the motor is rotating during a planned motor start, from standstill, no firing pulses for the thyristors of the commutator may be produced by the continuous or constant signal which is then provided at the output of the rotor position sensor. It is thus not easy to start the motor without difficulties.

The principal object of the invention is to provide a new and improved start circuit for a DC motor having a thyristor commutator.

An object of the invention is to provide a start circuit for a DC motor having a thyristor commutator, which overcomes the disadvantages of known types of thyristor commutators.

An object of the invention is to provide a start circuit for a DC motor having a thyristor commutator, which permits easy starting of the motor without difficulty.

An object of the invention is to provide a start circuit for a DC motor having a thyristor commutator, which functions with efficiency, effectiveness and reliability.

In accordance with the invention, the disadvantages of known types of thyristor commutators are overcome by the provision of a pulse generator which produces additional control pulses for the switching transistors. The additional firing pulses for the thyristors of the commutator may be provided in a simple manner, by superimposing the output voltages of the pulse generator on the individual control voltages for the input transistors. The collector electrodes of the input transistors are connected to the control paths of the switching transistors. In accordance with another aspect of the invention, it is expedient to disconnect the output voltage of the pulse generator in accordance with the speed of the motor by means of a limit or threshold circuit which controls a switch. This results in very quiet running of the motor at higher speed.

A rotor position sensor, which is usually a sine-cosine sensor, is provided for energizing the individual windings of the motor in accordance with the position of the rotor of said motor. Therefore, the signal which is proportional to the speed of the motor, which is required for the automatic discontinuation of the additional control pulses, is preferably provided with the assistance of a static speed indicator. The output of the speed indicator is connected to the limit or threshold circuit. The speed indicator comprises first and second differentiators. The first differentiator is connected in series circuit arrangement with a first multiplier and the second differentiator is connected in series circuit arrangement with a second multiplier. The output voltages of the first and second multipliers are subtractively applied to an adding amplifier. Each of the two output voltages of the sine-cosine sensor, which sensor is coupled to the shaft of the motor, is applied to the input of a corresponding one of the differentiators and the input of a corresponding one of the multipliers. The multiplier to which each input is applied is not that which is connected in series circuit arrangement with the differentiator to which the same input is applied.

If the DC motor is energized by the output of a controlled rectifier or thyristor, the synchronizing part of the rectifier control unit may be utilized as a pulse generator.

In accordance with another embodiment of the invention, the additional firing or ignition pulses may be provided in a manner whereby the control paths of the switching transistors are energized by the collector potential of the corresponding input transistors. The input transistors are connected in parallel, in common, with a transistor switch located at the output of the pulse generator. The pulse generator may be provided, in a simple manner, with a charging capacitor which is connected via a resistor to a source of direct voltage. The charging capacitor has a discharge current path in which is connected a double base diode which may be fired or switched to its conductive condition by the capacitor voltage.

An economical embodiment for automatically discontinuing the operation of the timer, when the motor speed is higher, comprises connecting the base electrodes of the switching transistors with the collector electrodes of the corresponding input transistors via corresponding capacitors and connecting the collector-emitter paths of the switching transistors in parallel with the corresponding charging capacitors via corresponding decoupling diodes. The coupling of the collector electrode of each input transistor to the base electrode of the corresponding switching transistor via a capacitor prevents unnecessary dissipation or consumption of the control current during the standstill of the motor.

In accordance with the invention, a start circuit for a DC motor having a rotor, a thyristor commutator comprising a plurality of thyristors and firing circuit means coupled to the rotor of the motor and connected to the thyristors for conductively controlling the thyristors with control pulses in accordance with the position of the rotor of the motor, the firing circuit means including a plurality of firing transformers each connected to a corresponding one of the thyristors, a plurality of switching transistors each connected to a corresponding one of the firing transformers and control means coupled to the rotor of the motor and connected to the switching transistors for supplying control pulses to the switching transistors, comprises a pulse generator connected to the switching transistors of the firing circuits for providing additional control pulses for the switching transistors. Each of the switching transistors of the firing circuit means has a control path and the firing circuit means further comprises a plurality of input transistors each having a collector electrode connected to the control path of a corresponding one of said switching transistors and a base electrode connected to the pulse generator whereby the additional control pulses provided by the pulse generator are superimposed upon the control pulses supplied to the switching transistors via the input transistors.

In one embodiment of the invention, the pulse generator includes a switch for controlling the output of the additional control pulses and a limit circuit coupled to the rotor of the motor and controlling the operation of the switch for discontinuing the output of the additional control pulses from the pulse generator via the switch in accordance with the rotary speed of the motor.

A sine-cosine sensor has a pair of inputs coupled to the rotor of the motor and pair of outputs and speed indicating means has inputs coupled to the outputs of the sine-cosine sensor and an output connected to the limit circuit of the pulse generator. The speed indicating means comprises a first differentiator having an input connected to one of the inputs, a first multiplier having an input connected in series circuit arrangement with the first differentiator, another input connected to another of the inputs and an output, a second differentiator having an input connected to the other of the inputs, a second multiplier having an input connected in series circuit arrangement with the second differentiator, another input connected to the first of the inputs and an output, and summing means having an output connected to the limit circuit of the pulse generator, an input connected to the output of the first multiplier and another input connected to the output of the second multiplier for subtractively combining output signals from the first and second multipliers.

Motor energizing means connected between the output of the speed indicating means and the thyristors of the thyristor commutator includes rectifier means connected to the thyristors and a rectifier control unit connected to the rectifier means and having a synchronizing stage connected to the pulse generator for energizing the pulse generator.

In another embodiment of the invention, the pulse generator comprises a switching transistor connected as the output stage thereof and connected in parallel to the collector electrode of each of the input transistors and the control path of each of the switching transistors is energized by the collector potential of the corresponding input transistor. The pulse generator comprises a source of direct voltage, a charging capacitor and a resistor connected in series circuit arrangement with the charging capacitor to the source of direct voltage, a discharge current path connected to a common point in the connection between the charging capacitor and the resistor, and a switching transistor connected as the output stage of the pulse generator and connected in parallel to the collector electrode of each of the input transistors.

The discharge current path of the pulse generator comprises a double base diode which is fired by the voltage of the charging capacitor.

Each of the switching transistors has a base electrode and an emitter-collector path and the firing circuit means further comprises a plurality of capacitors each connected between the collector electrode of a corresponding one of the input transistors and the base electrode of a corresponding one of the switching transistors, and a plurality of decoupling diodes each connected between the charging capacitor of the pulse generator and the emitter-collector path of a corresponding one of the switching transistors.

In order that the invention may be readily carried into effect, it will now be described with reference to the accompanying drawings, wherein:

FIG. 2 is a block diagram of an embodiment of the selector circuit of FIGS. 1, 4 and 5;

FIG. 4 is a block diagram, including a partial circuit diagram, of another embodiment of the start circuit of the invention; and FIG. 5 is a block diagram, including a partial circuit diagram, of still another embodiment of the start circuit of the invention.

In the FIGS., the same components are identified by the same reference numerals.

Figure 1:
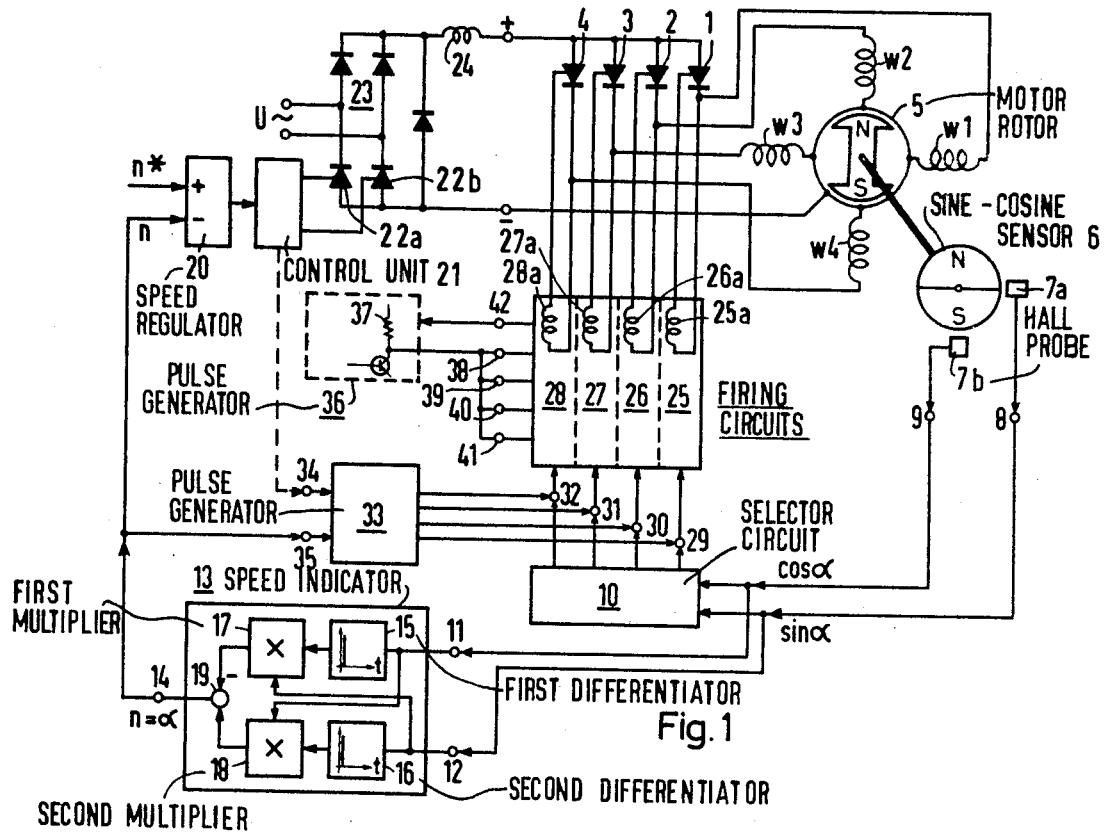
FIG. 1 is a block diagram of an embodiment of the start circuit of the invention.

FIG. 1 illustrates a speed controlled DC motor having an electronic commutator comprising four thyristors 1, 2, 3 and 4. The motor and thyristors are not shown in any of the other FIGS., although each of FIGS. 4 and 5 shows a single one of said thyristors in order to illustrate the connection of the remainder of the start circuit to said thyristor. The motor has a rotor 5 comprising a permanent magnet. The rotor or shaft of the motor is coupled to a sine-cosine sensor 6.

The sine-cosine sensor 6 comprises a permanent disc magnet having a pair of magnetic poles N and S and first and second Hall probes 7a and 7b mutually displaced by a peripheral angle of 90°. The first Hall probe 7a has an output terminal 8 and the second Hall probe 7b has an output terminal 9.

The first Hall probe 7a produces at its output terminal 8 a voltage which is proportional to the sine of the angle of rotation $\alpha$ of the motor. The second Hall probe 7b produces at its output terminal 9 a voltage which is proportional to the cosine of the angle of rotation $\alpha$ of the motor. The sine-proportional voltage and the cosine-proportional voltage are applied to the inputs of a selector circuit 10. The permanent magnet disc of the sine-cosine sensor 6 may, of course, be eliminated. In such case, the Hall probes 7a and 7b may be positioned or located at the stator circumference of the DC motor in a suitable manner.

The selector circuit 10 functions to prepare a pulse during each quarter rotation of the rotor 5 of the motor. The pulse provided by the selector circuit 10 initiates the energization of that one of the four motor windings w1, w2, w3 and w4 which provides the maximum torque with the rotating magnetic field of the rotor.

The voltage which is proportional to the sine of the angle of rotation of the motor and the voltage which is proportional to the cosine of the angle of rotation of the motor are also applied to input terminals 11 and 12 of a static speed indicator 13. The speed indicator 13 provides, at an output terminal 14, a voltage proportional to the magnitude $$\dot\alpha = d\alpha/dt$$

which voltage is proportional to the motor speed $n$. The output voltage of the speed indicator 13 functions as the actual speed value $n$ and is applied to an input of a speed regulator 20. A voltage which functions as the desired datum or reference value $n^*$ is applied to the other input of the speed regulator 20.

The speed indicator 13 comprises a first differentiator 15, a second differentiator 16, a first multiplier 17 and a second multiplier 18. The first multiplier 17 is connected in series circuit arrangement with the first differentiator 15. The second multiplier 18 is connected in series circuit arrangement with the second differentiator 16. The input terminal 11 of the speed indicator 13 is connected to the input of the first differentiator 15 and to an input of the second multiplier 18. The input terminal 12 if the speed indicator 13 is connected to the input of the second differentiator 16 and to an input of the first multiplier 17. The output voltages of the first and second multipliers 17 and 18 are subtractively applied to an adding amplifier 19 or other suitable means for combining said output voltages.

Due to the differentiating effect of the first differentiator 15, said differentiator produces an output voltage proportional to the magnitude $$\dot\alpha \sin \alpha$$

and the second differentiator 16 produces an output voltage proportional to the magnitude $$\dot\alpha \cos \alpha.$$

The output voltage of the speed indicator 13, which appears at the output terminal 14, thus corresponds to the rotor speed $n$ of the motor. A magnitude proportional to the rotor speed of the motor may also be provided, in a known manner, by the utilization of a tachometer.

The output signal or voltage of the speed regulator 20 triggers a control unit 21, which comprises a known circuit arrangement for the firing or ignition of two thyristors 22a and 22b. The thyristors 22a and 22b are connected in a bridge circuit 23 energized by an AC power supply voltage U. Of the four rectifiers of the bridge circuit, only the thyristors 22a and 22b are controlled rectifiers. A zero anode is connected to the bridge circuit 23 in order to relieve the power supply system. The direct current provided by the bridge circuit 23 via a smoothing reactor or inductor 24, and thus the torque of the motor, varies in accordance with the control rate of the thyristors 22a and 22b of said bridge circuit. This continues until the datum or reference magnitude of the speed of the motor and the actual magnitude of the speed of said motor are the same.

The firing or ignition pulses of the thyristors 1, 2, 3 and 4 of the commutator are provided by secondary windings of firing or ignition transformers included in a plurality of firing or ignition circuits 25, 26, 27 and 28. The firing circuit 25 includes a firing transformer having a secondary winding 25a. The secondary winding 25a is connected to the control electrode of the thyristor 1. The firing circuit 26 includes a firing transformer having a secondary winding 26a. The secondary winding 26a is connected to the control electrode of the thyristor 2. The firing circuit 27 includes a firing transformer having a secondary winding 27a. The secondary winding 27a is connected to the control electrode of the thyristor 3. The firing circuit 28 includes a firing transformer having a secondary winding 28a. The secondary winding 28a is connected to the control electrode of the thyristor 4.

The triggering pulses required to trigger, fire, ignite, or switch to their conductive condition, the thyristors 1, 2, 3 and 4, are derived from the output pulses of the selector circuit 10. The selector circuit 10 has a plurality of output terminals 29, 30, 31 and 32. Each of the output terminals 29, 30, 31 and 32 of the selector circuit 10 functions as an input terminal of a corresponding one of the firing circuits 25, 26, 27 and 28. The firing or ignition transformers of the firing circuits 25, 26, 27 and 28 can only provide voltage pulses, but not DC voltage. It is therefore necessary that a cyclic signal variation should occur continuously or constantly at the input terminals 29, 30, 31 and 32 in order to maintain continuous or constant ignition or firing of the thyristors. When the motor is at standstill, however, a purely direct voltage is provided at the output terminals 8 and 9 of the Hall probes 7a and 7b, and, therefore, also at the output terminals of the selector circuit 10.

In accordance with the invention, a pulse generator 33 is provided. The pulse generator 33 produces periodic supplemental pulses. The output pulses produced by the pulse generator 33 are applied to the input terminals 29, 30, 31 and 32 of the firing circuits 25, 26, 27 and 28, respectively. The selector circuit 10 controls the firing of the corresponding thyristors 1 to 4 of the commutator via the input terminals 29 to 32 only for specific rotor positions of the motor.

As indicated in broken lines in FIG. 1, the energizing voltage of the pulse generator 33 may be provided by the synchronization stage or circuit of the control unit 21, thereby eliminating the need for a separate oscillator. Such an energizing voltage may be applied via an input terminal 34 of the pulse generator 33. The pulse generator 33 has another input terminal 35, which is connected to the output terminal 14 of the speed indicator 13. Thus, when the motor reaches a specific speed, a command signal may be sent to the pulse generator 33 to discontinue the supply of additional control pulses.

The additional control or firing pulses provided by the pulse generator 33 are superimposed upon the pulses provided by the selector circuit 10 at the input terminals 29, 30, 31 and 32 of the firing circuits 25, 26, 27 and 28, respectively. Instead of providing the additional firing pulses at the input terminals 29 to 32, a pulse generator 36 may be provided. The pulse generator 36 comprises a transistor switch 37 which is energized by an oscillator. The transistor switch 37 has a collector electrode connected in common to a plurality of input terminals 38, 39, 40 and 41 of the firing or ignition circuits 25, 26, 27 and 28.

The supply of the additional firing pulses produced by the pulse generator 36 to the firing circuits 25 to 28 via the input terminals 38 to 41, respectively, insures the provision of additional firing pulses for corresponding ones of the thyristors 1, 2, 3 and 4, in accordance with the rotation of the rotor of the motor. The pulse generator 36 has an input terminal 42. A signal may be derived from the firing circuits 25, 26, 27 and 28 and applied to the input terminal 42 of the pulse generator 36 to additionally energize the transistor switch 37 thereof after a specific firing or ignition frequency has been provided, that is, starting with a specific motor speed.

FIG. 2 illustrates a selector circuit which may be utilized as the selector circuit 10 of FIGS. 1, 4 and 5. The selector circuit 10 has input terminals 8 and 9 and output terminals 29, 30, 31 and 32, as in FIG. 1. The input of a limit or threshold circuit 43 is connected to the input terminal 9. The input of a limit or threshold circuit 44 is connected to the input terminal 8. The first Hall probe 7a FIG. 1 supplies a voltage proportional to the sine of the angle of rotation $\alpha$ of the rotor of the motor to the input terminal 8. The second Hall probe 7b (FIG. 1) supplied a voltage proportional to the cosine of the angle of rotation $\alpha$ of the rotor of the motor to the input terminal 9.

At positive magnitudes of the voltages applied to the input terminals 8 and 9, a constant positive voltage or signal is provided at the output $a$ of the limit circuit 43 and at the output $b$ of the limit circuit 44. The output $a$ of the limit circuit 43 is connected to an input of an AND gate 45 and to an input of an OR gate 46. The output $b$ of the limit circuit 44 is connected to the second input of the AND gate 45, the second input of the OR gate 46 and a first input of an AND gate 47. The AND gate 45 has an output $c$ connected to a second input of the AND gate 47, a first input of an AND gate 48 and the output terminal 30. The OR gate 46 has an output $d$ connected to the third input of the AND gate 47, a second input of the AND gate 48 and the output terminal 32.

The AND gate 47 has an output e connected to the third input of the AND gate 48 and the output terminal 31. The AND gate 48 has an output $f$ connected to the output terminal 29. The inputs of the AND gate 47 are thus energized by outputs $b$, $c$ and $d$.

Figure 3:
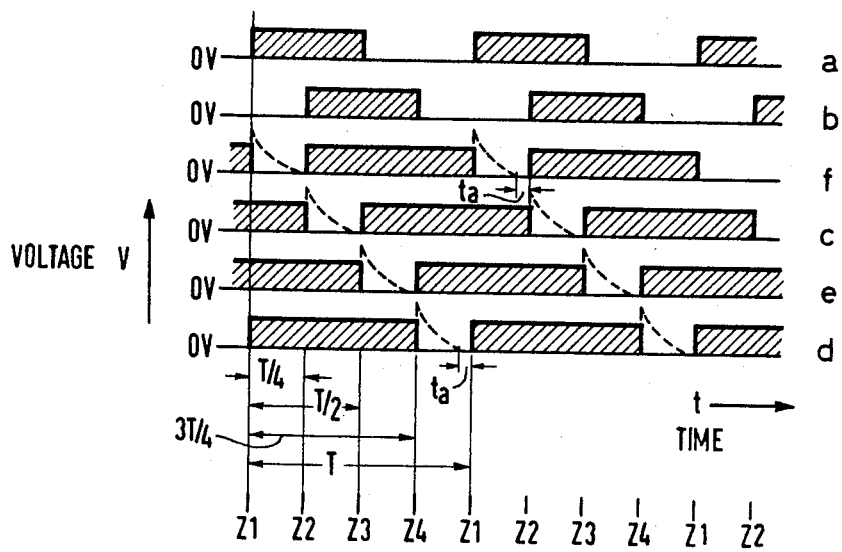
FIG. 3 is a graphical presentation of the various voltages appearing in the selector circuit of FIG. 2.

FIG. 3 illustrates the pulses or signals occurring at the outputs $c$, $d$, $e$ and $f$ of the selector circuit 10 of FIG. 2 and at the outputs of the limit circuits 43 and 44 of said selector circuit. The pulses are provided for a motor which rotates at a rotary or angular speed of $$\dot\alpha = 2\pi/T.$$

The time T is the period of rotation of a single revolution of the rotor. When the output terminals 29 to 32 of the selector circuit 10 coincide with the input terminals of the firing circuits 25 to 28, respectively, a zero signal continuously appears at said terminals in a sequence depending upon one quarter revolution of the rotor of the motor.

In FIG. 3, the abscissa represents the time $t$ and the ordinate represents the voltage V. The onset of the zero signal may be utilized, at time instants Z1, Z2, Z3 and Z4, to cyclically trigger the thyristors 1, 2, 3 and 4 of the commutator. When the motor is at standstill, a zero signal constantly occurs at one of the terminals 29, 30, 31 and 32, while the others of said terminals have a positive potential.

In the embodiment of FIG. 4, additional trigger, firing, ignition, or the like, pulses are superimposed on the pulses from the selector circuit 10 at the input terminals 29, 30, 31 and 32 of the firing or ignition circuits 25, 26, 27 and 28, respectively. In the embodiment of FIG. 4, each of the firing circuits 25, 26, 27 and 28 comprises an identical circuit. However, in order to maintain the clarity of illustration, the circuit of only the firing circuit 25 is illustrated. The firing circuit 25 is, however, illustrative of the firing circuits 26, 27 and 28, as well.

The firing circuit 25 comprises a firing transformer 49 having a secondary winding connected to the control path of the thyristor 1 of the commutator (FIG. 1). Thus, one end of the secondary winding of the firing transformer 49 is connected to the control electrode of the thyristor 1 and the other end of said winding is connected to the cathode of said thyristor whereby said thyristor is fired, ignited or switched to its conductive condition, by said secondary winding. The secondary winding of the firing transformer of the firing circuit 26 is similarly connected to, and similarly controls, the thyristor 2. The secondary winding of the firing transformer of the firing circuit 27 is similarly connected to, and similarly controls, the thyristor 3. The secondary winding of the firing transformer of the firing circuit 28 is similarly connected to, and similarly controls, the thyristor 4.

The primary winding of the firing transformer 49 is connected in series with the collector-base path of a switching transistor 50 and a current limiting resistor 51, to a DC voltage source +U of positive polarity. The switching transistor 50 has a base electrode connected to the collector electrode of an input transistor 52. The input transistor 52 has a base electrode connected to the input terminal 29 of the firing circuit 25.

The base electrode of the input transistor of the firing circuit 26 is connected to the input terminal 30. The base electrode of the input transistor of the firing circuit 27 is connected to the input terminal 31. The base electrode of the input transistor of the firing circuit 28 is connected to the input terminal 32. The output voltages or signals $f$, $c$, $e$ and $d$ of the selector circuit 10 are applied to the input terminals 29 to 32 of the firing circuits 25 to 28, respectively, via a plurality of decoupling diodes 29a, 30a, 31a and 32a. The output voltage of an amplifier 53 is also superimposed upon the output signals $f$, $c$, $e$ and $d$ of the selector circuit 10 via a plurality of decoupling diodes 29b, 30b, 31b and 32b. The input voltage of the amplifier 53 is a pulse voltage applied to an input terminal 34 of said amplifier and may be derived, for example, from the synchronization stage or circuit of the control unit 21 (FIG. 1).

The output signal or voltage of the amplifier 53 may be suppressed by a switch 54, when said switch is in its open condition. The switch 54 is controlled by the response of a limit or threshold circuit 55. The limit circuit 55 has an input terminal 35 to which a signal $n$, proportional to the speed of the motor, is supplied. When the input signal $n$ to the limit circuit 55 exceeds an assumed limit or threshold $e1$ or $e2$, the switch 54 is opened and the output voltage of the amplifier 53 disappears. The limits $e1$ and $e2$ are for opposite directions of rotation of the motor.

When the speed of the motor is sufficiently high, the circuit of FIG. 4 operates as follows. The control signal applied to the base of the input transistor 52 of the firing circuit 25 and of the input transistor of each of the firing circuits 26, 27 and 28, changes once for each rotation or revolution of the rotor of the motor, from a positive magnitude to zero magnitude. The input transistor 52, and that of each of the firing circuits 26, 27 and 28, is initially in conductive condition, but is switched to its non-conductive condition when the control signal changes from a positive magnitude to zero magnitude. When the input transistor 52 is switched to its non-conductive condition, the switching transistor 50 is switched to its conductive condition.

When the switching transistor 50 is switched to its conductive condition, an output pulse is provided by the firing transformer 49. The output pulse of the firing transformer 49 is produced in the secondary winding thereof and switches the corresponding thyristor 1 of the commutator to its conductive condition. One-quarter revolution later, the signal at the input terminal 29 again assumes a positive potential and the input transistor 52 is again switched to its conductive condition. When the input transistor 52 is switched to its conductive condition, the switching transistor 50 is switched to its non-conductive condition and the firing transformer 49 becomes demagnetized and returns to its condition of prior to the firing or ignition of the thyristor 1.

When the motor is at standstill due, for example, to the disconnection or discontinuation of the direct voltage which energizes the thyristors of the commutator, there is no signal change at the outputs f, c, e and d, or 29, 30, 31 and 32 of the selector circuit 10. Dependent upon the position of the rotor of the motor, one of the switching transistors of the firing circuits 25, 26, 27 and 28 is switched to its conductive condition and the corresponding firing transformer connected thereto is energized or saturated. If the voltage which energizes the thyristors of the commutator is additionally applied in order to undertake a planned start of the motor, nothing changes in this condition, since in the absence of firing or ignition pulses the motor cannot start.

The switch 54 of the pulse generator 33 of FIG. 4 is closed during standstill of the motor. Since the switch 54 is closed, the output pulses of the amplifier 53 are provided at the input terminals 29, 30, 31 and 32 of the firing circuits 25, 26, 27 and 28, respectively. The superimposed additional pulses provided by the amplifier 53 may effect periodic opening and closing of the switching transistors of the firing circuits, and thus the production of firing pulses for the corresponding thyristors, only during the firing stage. The selector circuit 10 provides the zero signal to the switching transistors of the firing circuits 25 to 28. Thus, the additional superimposed pulses are automatically applied to the thyristor of the commutator which is intended to be fired or ignited, in accordance with the position of the rotor of the motor. A separate distribution circuit for the additional pulses may thus be omitted.

The motor may therefore be reliably started from standstill. When a specific rotary or angular speed is reached by the motor, the supplementary circuit or pulse generator 33 is discontinued in operation with the assistance of the limit circuit 55 thereof.

FIG. 5 shows another arrangement for providing the additional control pulses for the switching transistor 50 and the switching transistor of each of the firing circuits 26, 27 and 28. In FIG. 5, the circuit of the firing circuit 25 is illustrated and those of the firing circuits 26, 27 and 28 are not illustrated in the interest of maintaining the clarity of illustration. The discussion of the firing circuit 25 applies to the firing circuits 26, 27 and 28 as well. In the embodiment of FIG. 5, a self-oscillating multivibrator or flip flop circuit is utilized. The additional pulses are automatically suppressed at higher motor speeds, due to the particular design of the firing or ignition circuits. The structure of the firing or ignition circuits 25, 26, 27 and 28 of FIG. 5 differs considerably from that of said firing circuits of FIG. 4.

The base electrode of the switching transistor 50 is coupled to the collector electrode of the input transistor 52 via a corresponding capacitor 56. The input transistor 52 is triggered or controlled by the selector circuit 10 in the afore-described manner. In each of the firing circuits 26, 27 and 28, the base electrode of the switching transistor is coupled to the collector electrode of the input transistor via a corresponding capacitor. When the input transistor 52 is switched to its non-conductive condition, the capacitor 56 begins to charge via the collector resistance of said transistor. The charge current of the capacitor 56 switches the switching transistor 50 to its conductive condition.

Upon the completion of the charging of the capacitor 56, the switching transistor 50 is switched to its non-conductive condition, whereupon the firing transformer 49 commences to demagnetize and thus returns to its initial unenergized condition. The principal course of the charge current of the capacitor 56, which is the charge current of the corresponding capacitor of each of the firing circuits, is shown by the broken lines in FIG. 3, occurring at different times. The charge current of the capacitor 56 does not depend upon the speed of the motor. It is interesting that in the circuit arrangement of FIG. 5, there is a specific maximum feasible time range, even at low motor speeds, during which the switching transistor 50 is in its conductive condition. Due to the switching transistor 50 being in its conductive condition, a current flows through the primary winding of the firing transformer 49. The time range during which the switching transistor 50 is in its conductive condition is determined by the charge time constant of the capacitor 56.

A current limiting resistance may thus be eliminated and unnecessary control current losses may be avoided. After the signal at the input terminal 29, 30, 31 or 32 of the firing circuit 25, 26, 27 or 28, respectively, changes from zero magnitude to a positive magnitude, the input transistor of such firing circuit is switched to its conductive condition. When the input transistor such as, for example, the input transistor 52 of the firing circuit 25, is switched to its conductive condition, the capacitor such as, for example, the capacitor 56, discharges via said input transistor and via a resistor such as, for example, the resistor 57 of the firing circuit 25. When the capacitor discharges via the corresponding input transformer and the corresponding resistor, another control pulse for the corresponding switching transistor such as, for example, the switching transistor 50 of the firing circuit 25, is suppressed thereby, provided the control pulse has not already become zero due to the decay of the capacitor charge current.

In the embodiment of FIG. 5, the pulse generator 36 comprises a self-oscillating multivibrator or flip flop circuit, a charging capacitor C1 and a resistor R1, connected in series to the positive polarity terminal +U of a source of direct voltage. A double base diode 58 is connected to a common point in the connection between the capacitor C1 and the resistor R1. The double base diode 58 is switched to its conductive condition at a specific magnitude of the charging voltage of the capacitor C1 when said charging voltage increases. When the double base diode 58 is switched to its conductive condition, the switching transistor 37, connected to said double base diode, is switched to its conductive condition. The switching transistor 37 remains in its conductive condition for the duration of the discharge of the capacitor C1 via the double base diode 58. When the voltage of the capacitor C1 increases, the double base diode 58 and the switching transistor 37 are switched to their non-conductive condition. The capacitor C1 then charges.

The switching transistor 37 is connected at the output stage of the pulse generator 36 of the embodiment of FIG. 5. The switching transistor 37 is connected in parallel with an input terminal 38 of the firing circuit 25, an input terminal 39 of the firing circuit 26, an input terminal 40 of the firing circuit 27 and an input terminal 41 of the firing circuit 28. The input terminal 38 is coupled to the collector electrode of the input transistor 52 of the firing circuit 25. Each of the input terminals 39, 40 and 41 is similarly coupled to the collector electrode of the corresponding input transistor of the firing circuits 26, 27 and 28, respectively.

The periodic switching of the switching transistor 37 of the pulse generator 36 to its conductive and non-conductive condition may produce a firing or ignition pulse only in that firing circuit, the input transistor of which is switched to its non-conductive condition by an output signal of the selector circuit 10. This is due to the fact that the periodic opening and closing of a switch connected in parallel with a closed switch cannot create an additional effect. Thus, only that thyristor of the commutator which is desired to be fired or ignited is supplied with additional firing pulses.

The automatic suppression of the additional pulses in the embodiment of FIG. 5 results from the provision of a decoupling diode 60 in the firing circuit 25 and a corresponding decoupling diode in each of the firing circuits 26, 27 and 28. The collector electrode of the switching transistor 50 is coupled to the charging capacitor C1 of the multivibrator circuit via the decoupling diode 60. The charging capacitor C1 of the multivibrator is coupled to the collector electrode of the switching transistor of each of the firing circuits 26, 27 and 28 via a corresponding decoupling diode.

The charging capacitor C1 of the multivibrator can only charge during periods of time when none of the switching transistors of the different firing circuits 25, 26, 27 and 28 is controlled during the individual firing stages. Thus, a sufficiently long charging period remains for the capacitor C1 only at lower speeds of the motor to enable said capacitor to be charged to the magnitude of the firing or ignition voltage of the double base diode 58 in order to enable the initiation of the additional firing pulses. Two successive periods of time when a charging of the capacitor C1 is possible are shown in FIG. 3 as $t_a$.

It is clear that through appropriate selection of the charge time constants of the capacitor 56 and the corresponding capacitors of the firing circuits 26, 27 and 28, the charge time constant R1, C1 which determines the frequency of oscillation of the multivibrator circuit may be kept substantially as low as desired. This is of advantage in avoiding commutation short-circuits and thereby providing considerable smoothness in the running of the motor.

While the invention has been described by means of specific examples and in specific embodiments, we do not wish to be limited thereto, for obvious modifications will occur to those skilled in the art without departing from the spirit and scope of the invention.

We claim:

1. A start circuit for a DC motor having a rotor, a thyristor commutator comprising a plurality of thyristors and firing circuit means coupled to the rotor of the motor and connected to said thyristors for conductively controlling said thyristors with control pulses in accordance with the position of the rotor of the motor, said firing circuit means including a plurality of firing transformers each connected to a corresponding one of said thyristors, a plurality of switching transistors each connected to a corresponding one of said firing transformers and control means coupled to the rotor of the motor and connected to the switching transistors for supplying control pulses to the switching transistors during a starting period, said start circuit comprising a pulse generator connected to the switching transistors of the firing circuits for providing additional control pulses for said switching transistors during the starting period.

2. A start circuit as claimed in claim 1, wherein each of the switching transistors of the firing circuit means has a control path and wherein said firing circuit means further comprises a plurality of input transistors each having a collector electrode connected to the control path of a corresponding one of said switching transistors and a base electrode connected to said pulse generator whereby the additional control pulses provided by said pulse generator are superimposed upon the control pulses supplied to the switching transistors via the input transistors.

3. A start circuit as claimed in claim 2, wherein the pulse generator comprises a switching transistor connected as the output stage thereof and connected in parallel to the collector electrode of each of said input transistors and the control path of each of said switching transistors is energized by the collector potential of the corresponding input transistor.

4. A start circuit as claimed in claim 2, wherein the pulse generator comprises a source of direct voltage, a charging capacitor and a resistor connected in series circuit arrangement with the charging capacitor to the source of direct voltage, a discharge current path connected to a common point in the connection between the charging capacitor and the resistor, and a switching transistor connected as the output stage of said pulse generator and connected in parallel to the collector electrode of each of said input transistors.

5. A start circuit as claimed in claim 2, wherein said pulse generator includes a switch for controlling the output of the additional control pulses and a limit circuit coupled to the rotor of the motor and controlling the operation of said switch for discontinuing the output of the additional control pulses from said pulse generator via said switch in accordance with the rotary speed of the motor.

6. A start circuit as claimed in claim 4, wherein the discharge current path of the pulse generator comprises a double base diode which is fired by the voltage of the charging capacitor.

7. A start circuit as claimed in claim 4, wherein each of the switching transistors has a base electrode and an emitter-collector path and wherein said firing circuit means further comprises a plurality of capacitors each connected between the collector electrode of a corresponding one of the input transistors and the base electrode of a corresponding one of the switching transistors, and a plurality of decoupling diodes each connected between the charging capacitor of the pulse generator and the emitter-collector path of a corresponding one of the switching transistors.

8. A start circuit as claimed in claim 5, further comprising a sine-cosine sensor having a pair of inputs coupled to the rotor of the motor and a pair of outputs and speed indicating means having inputs coupled to the outputs of the sine-cosine sensor and an output connected to the limit circuit of said pulse generator.

9. A start circuit as claimed in claim 8, wherein said speed indicating means comprises a first differentiator having an input connected to one of said inputs, a first multiplier having an input connected in series circuit arrangement with the first differentiator, another input connected to another of said inputs and an output, a second differentiator having an input connected to the other of said inputs, a second multiplier having an input connected in series circuit arrangement with the second differentiator, another input connected to the first of said inputs and an output, and summing means having an output connected to the limit circuit of said pulse generator, an input connected to the output of the first multiplier and another input connected to the output of the second multiplier for subtractively combining output signals from said first and second multipliers.

10. A start circuit as claimed in claim 9, further comprising motor energizing means connected between the output of said speed indicating means and the thyristors of the thyristor commutator, said motor energizing means including rectifier means connected to said thyristors and a rectifier control unit connected to said rectifier means and having a synchronizing stage connected to said pulse generator for energizing said pulse generator.

* * * * *